US011421748B2

(12) United States Patent
Lee

(10) Patent No.: US 11,421,748 B2
(45) Date of Patent: Aug. 23, 2022

(54) COIL SPRING SUPPORT FOR VEHICULAR SUSPENSION SYSTEM

(71) Applicant: Sang Wuk Lee, Anseong-si (KR)

(72) Inventor: Sang Wuk Lee, Anseong-si (KR)

( * ) Notice: Subject to any disclaimer, the term of this patent is extended or adjusted under 35 U.S.C. 154(b) by 0 days.

(21) Appl. No.: 17/047,056

(22) PCT Filed: Apr. 12, 2019

(86) PCT No.: PCT/KR2019/004444
§ 371 (c)(1),
(2) Date: Oct. 12, 2020

(87) PCT Pub. No.: WO2019/199120
PCT Pub. Date: Oct. 17, 2019

(65) Prior Publication Data
US 2021/0156441 A1     May 27, 2021

(30) Foreign Application Priority Data

Apr. 13, 2018 (KR) .................. 10-2018-0043419

(51) Int. Cl.
*F16F 1/12* (2006.01)
*B60G 11/14* (2006.01)
(52) U.S. Cl.
CPC .............. *F16F 1/121* (2013.01); *B60G 11/14* (2013.01); *B60G 2204/124* (2013.01); *F16F 2230/0005* (2013.01)
(58) Field of Classification Search
CPC ...... F16F 1/121; F16F 2230/0005; F16F 1/12; B60G 11/14; B60G 2204/124
See application file for complete search history.

(56) References Cited

U.S. PATENT DOCUMENTS 2,661,206 A * 12/1953 Gregoire ................. F16F 1/125
267/286
3,830,482 A * 8/1974 Norris ................... B60G 17/021
267/286
(Continued)

FOREIGN PATENT DOCUMENTS

JP            3090383 U    12/2002
KR     20-1999-0006485 U    2/1999
(Continued)

OTHER PUBLICATIONS

KR Office Action dated May 20, 2019 as received in Application No. 10-2018-0043419.
(Continued)

*Primary Examiner* — Robert A. Siconolfi
*Assistant Examiner* — James K Hsiao
(74) *Attorney, Agent, or Firm* — Maschoff Brennan

(57) ABSTRACT

The present invention relates to a coil spring support for a vehicular suspension system, which comprises a base plate and a support column protruding from the base plate, wherein a coil spring is coupled to the support column in such a manner that the lower end of the coil spring is fitted in and coupled to a coupling groove, which is formed on the outer peripheral surface of the support column and at a position having a predetermined height from the base plate, so that the coil spring support can be auxiliarily installed on a plate spring of a vehicle so as to compensate and improve a shock absorbing capability of the existing vehicle.

4 Claims, 6 Drawing Sheets

(56) References Cited

U.S. PATENT DOCUMENTS

| | | | | |
|---|---|---|---|---|
| 4,771,996 A * | 9/1988 | Martinez, Jr. | | B60G 13/006 188/321.11 |
| 5,248,134 A * | 9/1993 | Ferguson | | B60G 15/068 188/321.11 |
| 5,606,879 A * | 3/1997 | Froelicher | | D06F 37/20 68/23.3 |
| 5,658,006 A * | 8/1997 | Freeman | | B60G 11/16 267/179 |
| 6,179,309 B1 * | 1/2001 | Satou | | B60G 3/20 280/124.155 |
| 6,364,296 B1 * | 4/2002 | Cummings | | F16F 1/371 267/141 |
| 6,375,171 B1 * | 4/2002 | Zimmermann | | B25F 5/006 267/137 |
| 6,698,559 B1 * | 3/2004 | Liou | | B62K 25/04 188/286 |
| 6,827,184 B1 * | 12/2004 | Lin | | B60G 11/15 188/321.11 |
| 6,957,806 B2 * | 10/2005 | Tubbs | | B60G 7/04 267/122 |
| 7,261,307 B2 * | 8/2007 | Nuno | | B60G 3/20 280/124.1 |
| 7,293,764 B2 * | 11/2007 | Fang | | B60G 11/16 267/220 |
| 7,537,225 B2 * | 5/2009 | Ryshavy | | B60G 7/003 280/124.147 |
| 8,070,144 B2 * | 12/2011 | Lamb | | B60G 11/54 267/220 |
| 8,070,171 B2 * | 12/2011 | Wohlfarth | | B60G 15/063 280/6.157 |
| 8,087,676 B2 * | 1/2012 | McIntyre | | B60G 17/021 280/6.157 |
| 9,211,775 B1 * | 12/2015 | Ryshavy | | B60G 11/16 |
| 9,234,555 B2 * | 1/2016 | Nakamura | | F16F 1/125 |
| 9,315,085 B1 * | 4/2016 | Riley | | B60G 15/067 |
| 9,844,993 B2 * | 12/2017 | Botello | | B60G 17/021 |
| 9,914,335 B1 * | 3/2018 | Lin | | B60G 15/063 |
| 9,926,984 B2 * | 3/2018 | Uehara | | F16D 3/12 |
| 9,950,583 B2 * | 4/2018 | Kaneko | | B60G 15/063 |
| 2005/0092961 A1 * | 5/2005 | Ucman | | F16K 31/44 251/337 |
| 2005/0225051 A1 * | 10/2005 | Bennett | | B60G 11/16 280/124.179 |
| 2006/0082038 A1 * | 4/2006 | Al-Dahhan | | B60G 11/54 267/220 |
| 2008/0203764 A1 * | 8/2008 | Hikosaka | | B60G 11/54 296/193.01 |
| 2013/0087956 A1 * | 4/2013 | Krajenke | | E05F 1/1253 267/177 |
| 2014/0001684 A1 * | 1/2014 | Miyata | | B62J 1/04 267/132 |
| 2014/0159295 A1 * | 6/2014 | Nakamura | | F16F 1/125 267/170 |
| 2015/0375591 A1 * | 12/2015 | Sakairi | | F16C 17/10 384/297 |
| 2016/0016342 A1 * | 1/2016 | Al-Dahhan | | B60G 11/54 267/292 |
| 2016/0185173 A1 * | 6/2016 | Brown | | B60G 15/067 267/292 |
| 2016/0208877 A1 * | 7/2016 | Dietzel | | B62D 25/12 |
| 2018/0106322 A1 * | 4/2018 | Nakasone | | B60R 7/06 |
| 2018/0147909 A1 * | 5/2018 | Renn | | B60G 11/16 |
| 2019/0152361 A1 * | 5/2019 | Matsushita | | B60N 2/542 |
| 2019/0170290 A1 * | 6/2019 | Carton | | F24F 1/38 |
| 2019/0275634 A1 * | 9/2019 | White | | B24B 41/06 |

FOREIGN PATENT DOCUMENTS

| | | |
|---|---|---|
| KR | 10-1999-0043287 A | 6/1999 |
| KR | 20-0334830 Y1 | 12/2003 |
| KR | 10-2012-0035598 A | 4/2012 |
| KR | 10-2015-0054378 A | 5/2015 |
| KR | 10-1726377 B1 | 4/2017 |

OTHER PUBLICATIONS

KR Decision to Grant dated Oct. 1, 2019 as received in Application No. 10-2018-0043419.

* cited by examiner

COIL SPRING SUPPORT FOR VEHICULAR SUSPENSION SYSTEM

TECHNICAL FIELD

The present invention relates to a coil spring support installed to support a coil used in a vehicular suspension system.

BACKGROUND ART

A vehicular suspension system supports the weights of a vehicle body and a cargo and at the same time relieves the vertical vibrations of wheels to improve the ride comfort and prevent excessive loads from being applied to each part of a vehicle frame. In particular, in a commercial vehicle such as a bus and a truck, a suspension device for an axle to which a plate spring is applied is mainly installed to stably support a large load.

The plate spring includes plank-shaped steel plates which are stacked with lengths gradually shortened downward, and tied and fixed with U-shaped bolts. When the axle on which tires are installed is bounded due to irregularities or the like according to the condition of the road surface while the vehicle is driving, the plate spring connected thereto absorbs the impact and performs a suspension operation.

Meanwhile, the plate spring described above relatively well absorbs a strong impact having a large amplitude, but the responsiveness to a quick and instantaneous impact having a small amplitude is low, so that the impact force is partially transmitted to the vehicle body. In addition, when the suspension operation is performed only with the plate spring described above, as the plate spring repeatedly repeats the compression and tension operation, the strength and elasticity are weakened over time, so that the performance is degraded.

To solve the problems described above, there has been proposed a technique in which a separate coil spring is installed on the plate spring so that the lower end of the coil spring is supported by the plate spring and the upper end of the coil spring supports the vehicle body, thereby allowing the coil spring to additionally absorb the impact.

DOCUMENTS OF RELATED ART

Patent Document (Patent document 1) Korean Unexamined Patent Publication No. 10-1999-0043287 (published on Jun. 15, 1999)
(Patent document 2) Korea Patent Registration No. 10-1726377-0000 (issued on Apr. 12, 2017)

DISCLOSURE

Technical Problem

When the coil spring installed on the plate spring is separated while the vehicle is driving, a secondary accident may occur. Therefore, it is necessary to firmly fix the coil spring to prevent the coil spring from being separated. Accordingly, an object of the present invention is to propose a technology in which a coil spring installed on a plate spring can be firmly fixed without being separated while driving a vehicle, so that the coil spring can safely perform the functions thereof in association with the plate spring.

Technical Solution

The present invention achieves the above object by proposing a coil spring support that is detachably installed to an existing plate spring to support a coil spring and firmly fixes the coil spring such that the coil spring can be prevented from being separated.

Advantageous Effects

According to the coil spring support of the present invention, since the coil spring is installed in a state in which the coil spring is firmly fixed to a base plate, the coil spring is not separated while the vehicle is driving, and is stably installed so that the impact applied to the vehicle can be effectively absorbed. In particular, the structure for fixing the coil spring to the base plate can be assembled and disassembled so that the convenience of manufacturing and maintaining the coil spring support according to the present invention can be improved.

BEST MODE

Mode for Invention

In order that a coil spring installed on a plate spring is firmly fixed without being separated while a vehicle is driving, so that the coil spring assists the plate spring, thereby implementing the function of the plate spring, the present invention proposes a coil spring support for a vehicular suspension system, which includes a base plate, a support column protruding from the base plate, and a coil spring coupled to the support column, wherein a lower end of the coil spring is fitted into a coupling groove which is formed on an outer peripheral surface of the support column and at a position having a predetermined height from the base plate.

Figure 1:
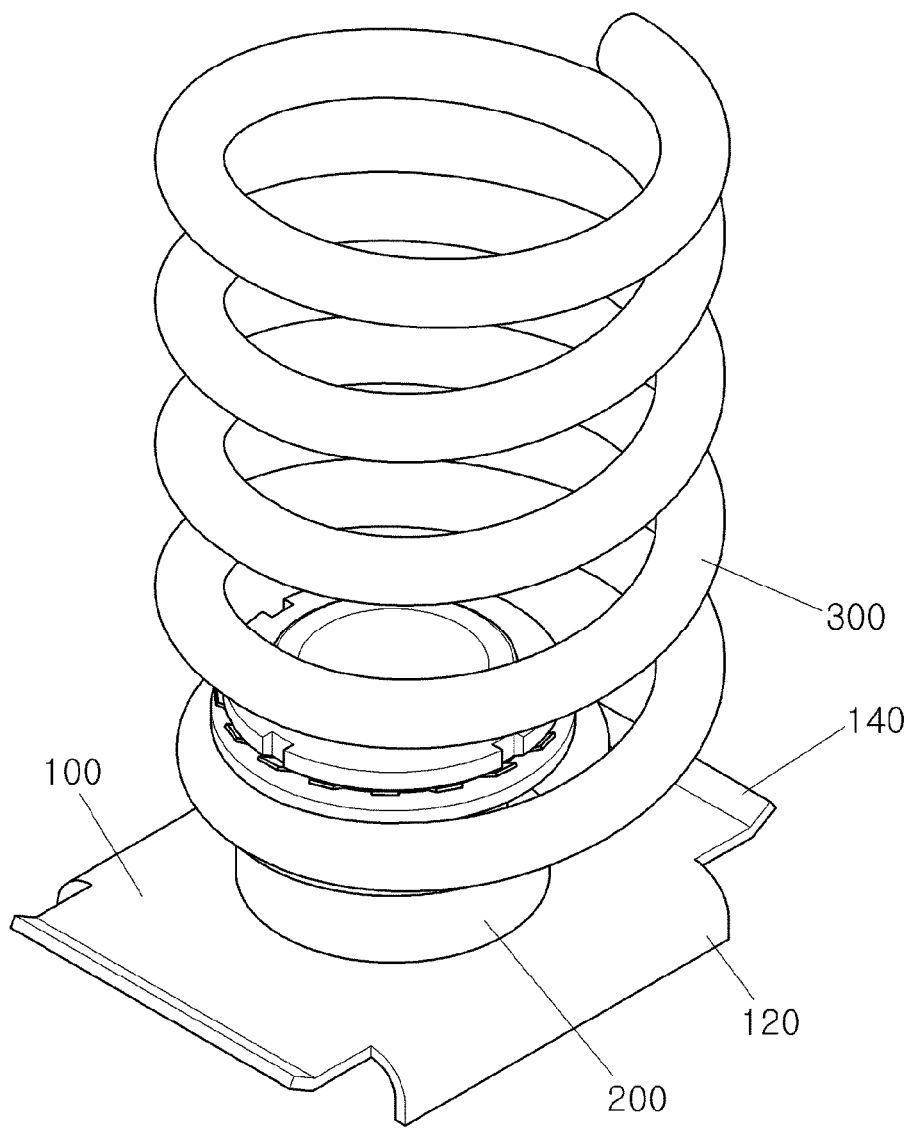
FIG. 1 is one exemplary view of a coil spring support for a vehicular suspension system according to the present invention.
Figure 2:
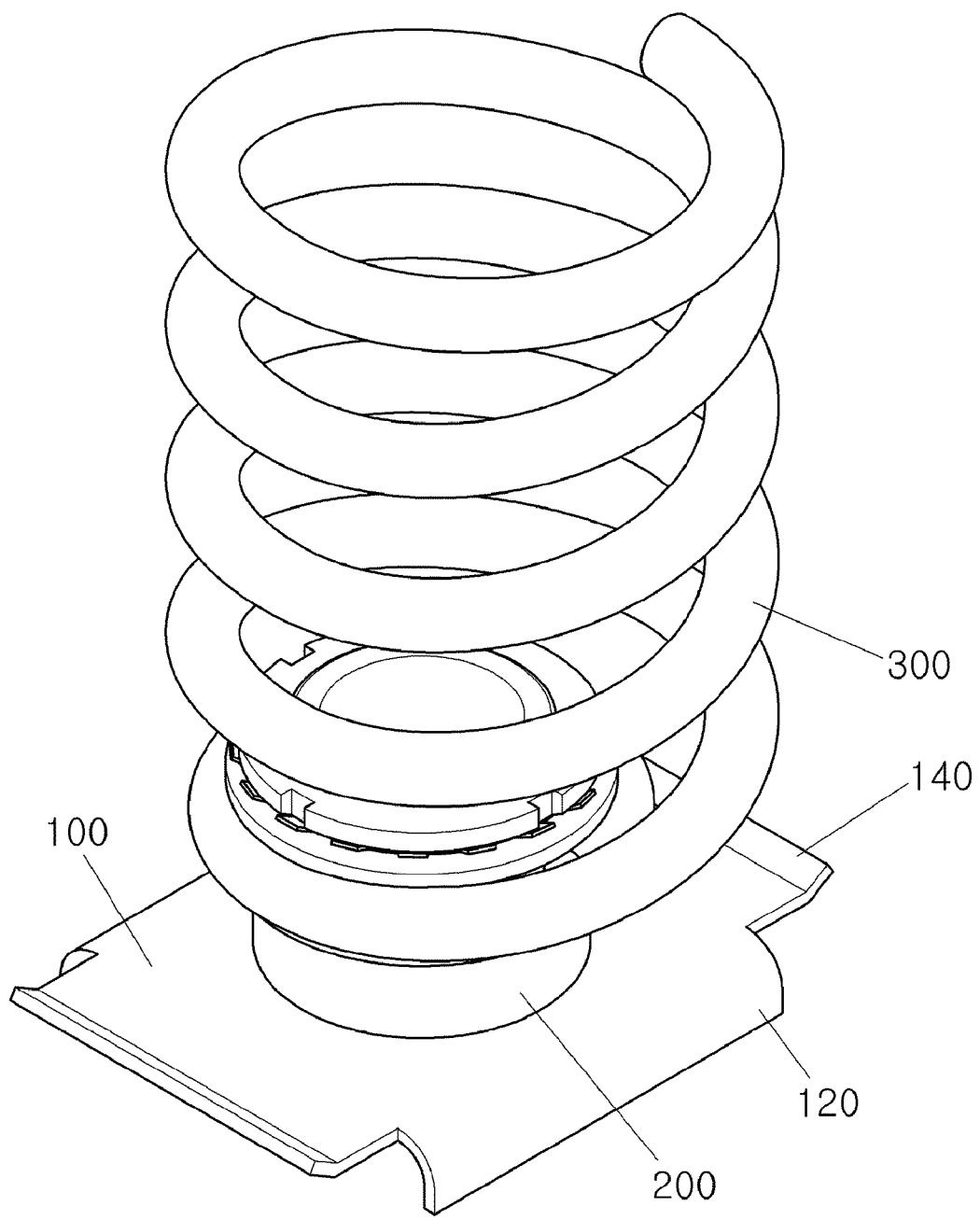
FIG. 2 is a view illustrating another exemplary view of a coil spring support for a vehicle suspension system according to the present invention in which the base plate has a different configuration.
Figure 3:
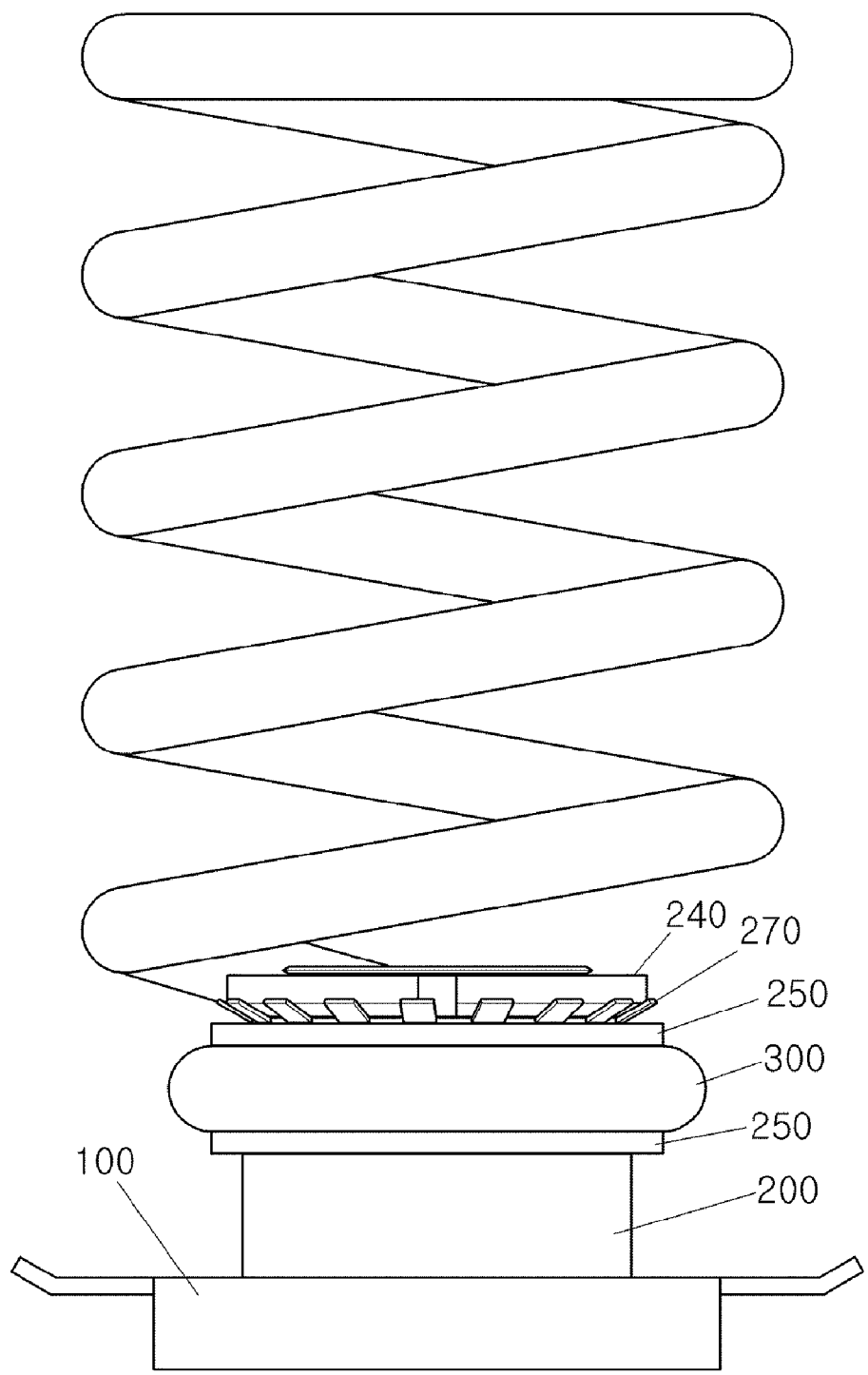
FIG. 3 is a front view of a coil spring support for a vehicle suspension system according to the present invention.
Figure 4:
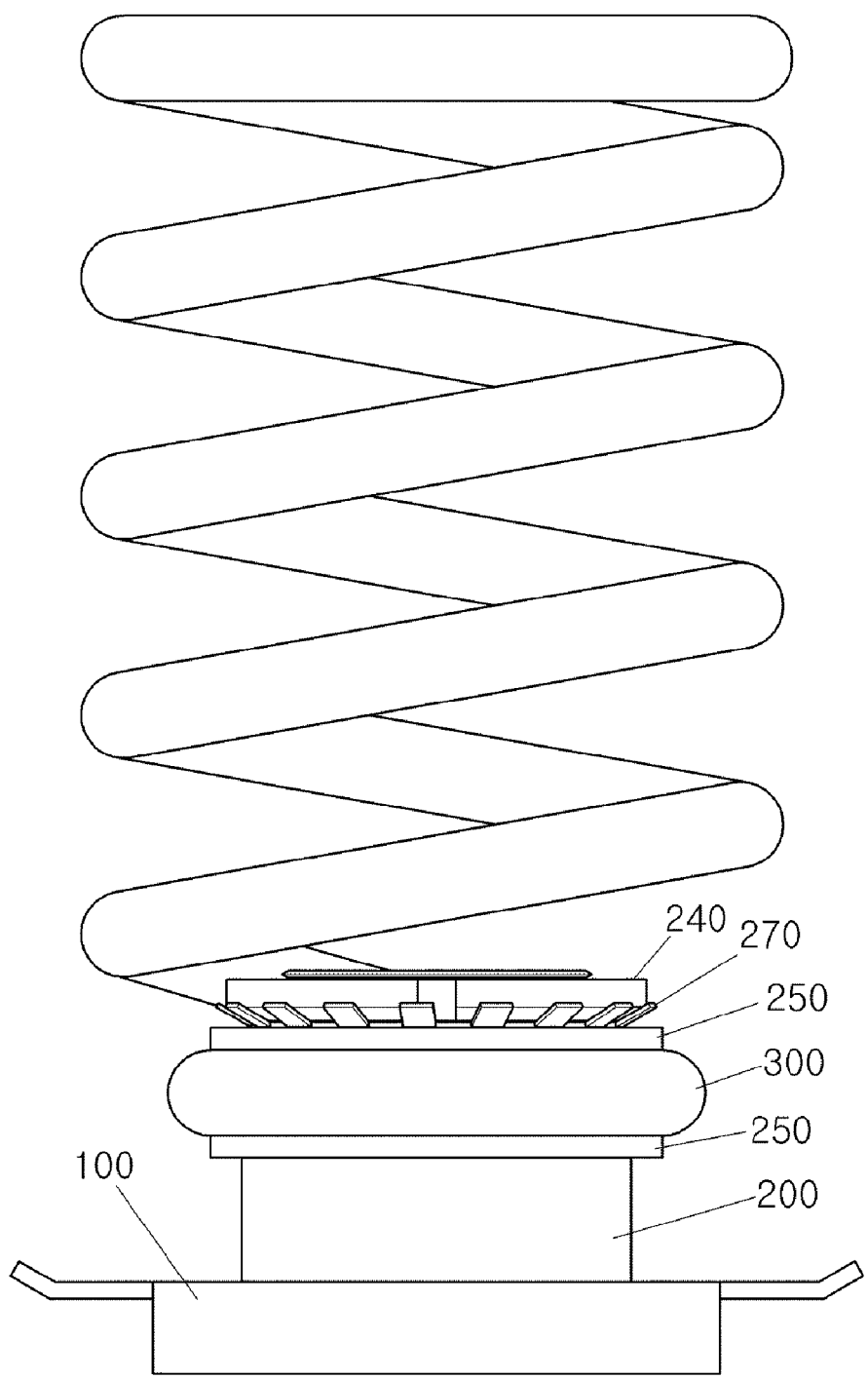
FIG. 4 is a cross-sectional view of a coil spring support for a vehicle suspension system according to the present invention.
Figure 5:
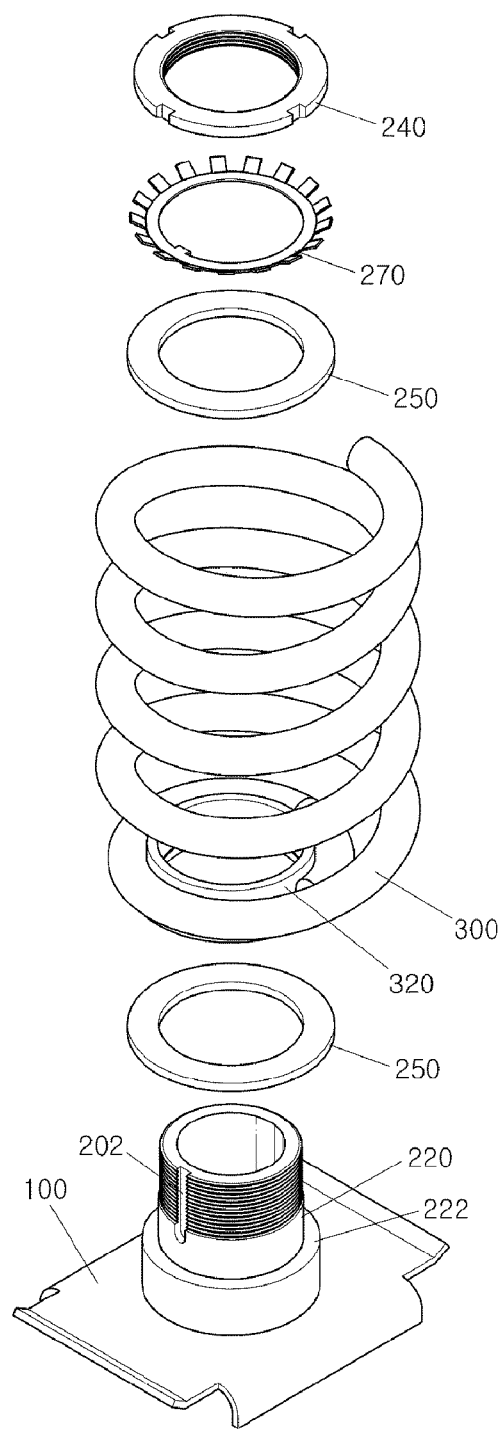
FIG. 5 is an exploded view of a coil spring support for a vehicle suspension system according to the present invention.
Figure 6:
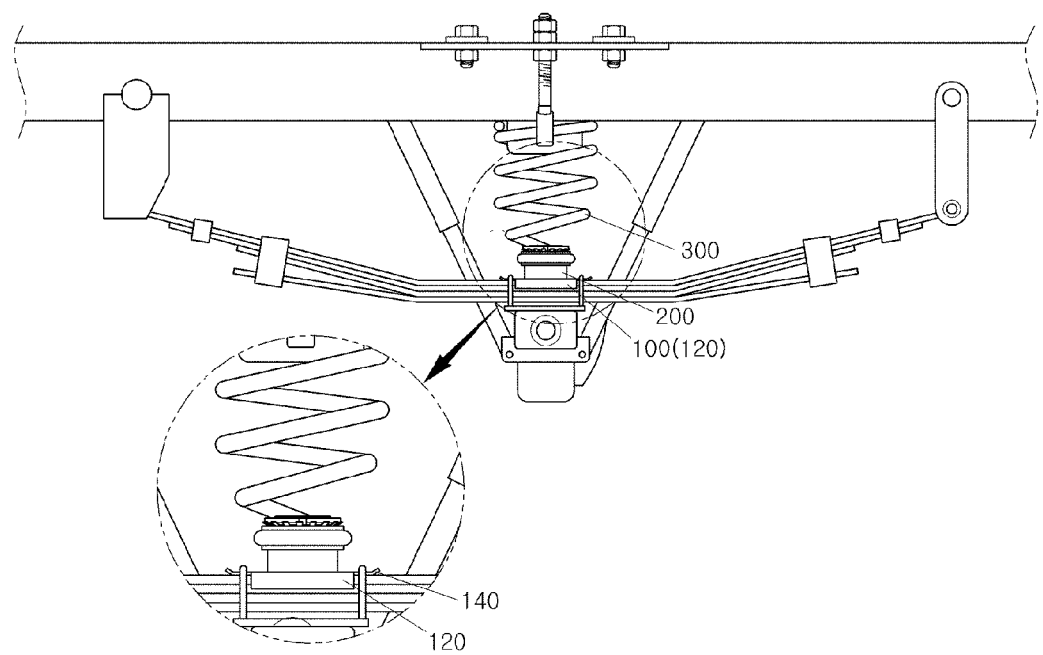
FIG. 6 is a view illustrating a state of using a coil spring support for a vehicle suspension system according to the present invention.

Hereinafter, the present invention will be described in detail with reference to FIGS. 1 to 6 of the accompanying drawings.

As shown, a coil spring support for a vehicle suspension system according to the present invention includes a base plate 100 and a support column 200 protruding from the base plate 100, where a coil spring is coupled to the support column 200.

The base plate 100 has a shape that can be placed on the plate spring 300. The base plate 100 may be formed to have a substantially plate shape, and the support column 200 protrudes from a central portion of the base plate 100. The base plate 100 formed as described above may be perforated to have a plurality of holes to which a unit for mounting and fixing the base plate 100 on the plate spring 300 installed in the vehicle, for example, a unit such as a U-shaped bolt, is fastened.

The base plate 100 may have a locking sill 120 formed downward on both side surfaces thereof. When the base plate 100 is mounted on the plate spring 300 as shown in FIG. 7, the locking sill 120 surrounds both side surfaces of the plate spring 300. As a result, it is possible to prevent the base plate 100 from moving left and right. In addition, separation preventing sills 140 may be formed upward on the front and rear ends of the base plate 100. This configuration may be adopted when a hole for fastening of a U-shaped bolt is not formed, and may prevent the U-shaped bolt from being separated from the base plate 100 by the separation sills 140 formed on the front and rear ends.

The support column 200 that is erected on the base plate 100 is formed of a substantially cylindrical pipe. When formed of metal, the base plate 100 is welded to the base plate 100 to be firmly fixed.

A coupling groove 260 is formed along the outer peripheral surface of the support column 200. The lower end of the coil spring 300 is fitted and coupled to the coupling groove 260. The lower end of the coil spring 300 having a ring shape is coupled to the coupling groove 260 while surrounding the coupling groove 260.

The coupling groove 260 may be formed from the base plate 100 to a predetermined point of the support column 200, but preferably the coupling groove 260 is formed at a position forming a predetermined height from the base plate 100. This configuration takes into account the structure of the plate spring installed in the vehicle. That is, since the plate spring 300 installed in the vehicle defines a space for installing the support according to the present invention, the coupling groove 260 is formed at a position forming a predetermined height from the base plate 100, so that, when the base plate 100 is fixed to the plate spring with the U-shaped bolt, the U-shaped bolt does not interfere with the lower end of the coil spring 300. To this end, the height at which the coupling groove 260 is formed is preferably formed higher than the thickness of the U-shaped bolt.

The support column 200 may include a base column 220 that is erected and installed on the base plate 100, and a coupling ring 240 coupled to an upper portion of the base column 220. By the configuration, a coupling groove 260 is formed in the support column 200 downward from the lower end of the coupling ring 240. The coil spring 300 is coupled to the coupling groove 260 by fixing the coupling ring 240 to the upper portion of the base column 220 while the lower end of the base column 220 is fitted to the lower end thereof.

The base column 220 may have a large diameter from the lower end to a predetermined height to form a sill portion 222. The sill portion 222 may be formed by coupling a ring formed at a predetermined height to a pipe of a specified standard, and the coupling groove 260 is naturally formed by a distance between the upper end of the sill portion 222 and the lower end of the coupling ring 240. Therefore, the coupling groove 260 is formed at a predetermined height from the base plate 100. Even in the above configuration, when the coupling ring 240 is assembled to an upper portion of the base column 220 after the lower end of the coil spring 300 is assembled to the base column 220, the lower end of the coil spring 300 is placed in the coupling groove 260. As a result, the coil spring 300 is assembled to the support column 200 in a state where the separation is prevented.

The coupling ring 240 may be formed to be screwed with the upper end of the base column 220. Although it is formed to be disassembled and assembled, in particular, when the coupling ring 240 is strongly tightened, the coupling ring 240 strongly presses the lower end of the coil spring 300 inserted in the coupling groove 260, so that the lower end of the coil spring 300 may be firmly fixed in a state that the lower end does not move in the coupling groove 260.

In this case, preferably, the coupling ring 240 has an outer periphery having a polygonal shape so that the coupling ring 240 can be tightened with a tool, or has grooves formed at regular intervals on the outer periphery to be tightened by hitting it with a hammer or the like.

Meanwhile, a clearance adjustment ring 320 may be fitted to the lower end of the coil spring 300. The clearance adjustment ring 320 has an inner peripheral diameter to be matched to the coupling groove 260 so that the clearance adjustment ring 320 is fitted into the coupling groove 260 while being fitted into the coil spring 300. Since the diameter of the lower end of the coil spring 300 is kept constant as desired by the configuration of the clearance adjustment ring 320, the convenience of assembling the base column 220 may be improved. In addition, it is possible to solve problems such as inability to assemble or excessive movement that may occur when there is an error in the diameter of the lower end of the coil spring 300.

In the present invention, it may further include a separation prevention ring 250 installed in the coupling groove 260. One or two of the separation prevention rings 250 may be formed in which the diameter of the outer periphery of the separation prevention ring 250 is larger than the diameter of the support column 200. Preferably, since two separation prevention rings 250 are formed, in this case, one of the separation prevention rings 250 is placed and supported on the upper end of the sill portion 222, and the other is supported by the lower end of the coupling ring 240 so that the depth is increased. The separation prevention rings 250 installed in such a manner are located at the upper and lower ends of the coil spring 300 fitted into the coupling groove 260, so that the coil spring 300 fitted in the coupling groove 260 is sufficiently contained in the coupling groove 260 to be complementally prevented from being separated from the coupling groove 260.

The separation prevention ring 250 may not be adopted when the coupling groove 260 is formed sufficiently deep. Because the space is narrow due to the structural characteristics of the point where the coil spring support according to the present invention is installed so that there is a limit to increase the diameter of the support column 200, such a limit may be overcome by the separation prevention ring 250.

In the present invention in which the separation prevention ring 250 is formed as described above, a washer 270 installed between the coupling ring 240 and the separation prevention ring 250 may be further included. The washer 270 serves to prevent the coupling ring 240 from being easily released. A key 272 may be formed on the inner periphery of the washer 270, and a key groove 202 may be formed on the outer periphery of the base column 220 in a vertical direction. The key 272 formed as described above is fitted into a key groove 202 and the washer 270 is installed in the base column 220, so that the washer 270 does not spin without traction. Therefore, it is possible to prevent a phenomenon in which the coupling ring 240 rotates together while the washer 270 while the washer 270 spins without traction.

In addition, the washer 270 may have a plurality of protrusions inclined upward in the direction of the coupling ring 140 at an edge thereof. The protrusions are pressed by the coupling ring 140 when the coupling ring 140 is tightened, and elastically presses the coupling ring 140 and the separation prevention ring 250. As a result, a force to prevent the coupling ring 140 from being easily released is provided.

As described above, the coil spring support according to the present invention is conveniently manufactured because the coil spring support are formed in a structure which is capable of disassembling and assembling each component. Furthermore, when the coil spring support is required to be maintained or repaired after being installed in a vehicle, the coil spring support may be easily disassembled to be maintained or repaired.

Hereinafter, a process of assembling the coil spring support according to the present invention, which includes all the above-described configurations, will be described as an example.

First, the base column 220 is welded to the base plate 100 to be fixed. A pipe of a specified standard is fixed by welding to the base plate 100, and then a ring formed at a predetermined height is coupled to the pipe to fix the base column 220 on which the sill portion 222 is formed to the base plate 100.

Then, the separation prevention ring 250 is assembled to the base column 220, and then the lower end of the coil spring 300 is fitted from the top of the base column 220 to the bottom of the base column 220 for assembly. In this case, the clearance adjustment ring 320 is pre-assembled to the lower end of the coil spring 300.

Thereafter, the separation prevention ring 250 and the washer 270 are sequentially assembled to the base column 220. When assembling the washer 270, the key 272 formed in the washer 270 is assembled by being fitted into the key groove 202 formed in the base column 220.

Finally, the coupling ring 240 is assembled to the base column 220. The assembly is performed in a screwing manner, and it is strongly tightened until the coupling ring 240 is no longer tightened using a separate tool.

When the above process is performed, the lower and upper portion of the lower end of the coil spring 300 are supported by the separation prevention ring 250 while the lower end of the coil spring 300 is inserted into the coupling groove 260, so that the coil spring 300 is coupled to the support column 200.

The coil spring support according to the present invention, which has been assembled according to the above-described process, is installed in the vehicle by fixing it using U-shaped bolts while the base plate 100 is mounted on the plate spring installed in the vehicle in advance. Accordingly, the coil spring 300 is installed between the plate spring and the vehicle body frame to support the impact and load generated during driving of the vehicle.

DESCRIPTION OF REFERENCE NUMERAL

100: Base plate
120: Locking sill
140: Separation prevention sill
200: Support column
202: Key groove
220: Base column
240: Coupling ring
250: Separation prevention ring
260: Coupling groove
270: Washer
272: Key
300: Coil spring

The invention claimed is:

1. A coil spring support for a vehicular suspension system, the coil spring support comprising:
   a base plate;
   a support column protruding from the base plate; and
   a coil spring coupled to the support column,
   wherein a lower end of the coil spring is fitted into a coupling groove which is formed on an outer peripheral surface of the support column at a position having a predetermined height from the base plate,
   wherein the support column includes a base column having a large diameter ranging from a lower end to a predetermined height to form a sill portion, and a coupling ring coupled to an upper portion of the base column,
   wherein the coupling groove is formed by a gap between an upper end of the sill portion and a lower end of the coupling ring, and
   wherein the upper portion of the base column is formed with screw threads such that the coupling ring is formed to be screwed with the upper portion of the base column.

2. The coil spring support of claim 1, further comprising: at least one separation prevention ring installed in the coupling groove and having an outer periphery having a diameter larger than a diameter of the support column, wherein the separation prevention ring is supported by the sill portion or the coupling ring to prevent a lower end of the coil spring from being separated from the coupling groove.

3. The coil spring support of claim 2, further comprising:
   a washer installed between the coupling ring and the separation prevention ring,
   wherein:
      a key is formed on an inner periphery of the washer,
      a key groove is formed in a vertical direction on an outer periphery of the base column, the key is inserted into the key groove, and
      the washer is installed on the base column.

4. The coil spring support of claim 1, further comprising:
   a clearance adjustment ring fitted into a lower end of the coil spring, wherein the clearance adjustment ring is fitted into the coupling groove in a state in which the clearance adjustment ring is fitted to the lower end of the coil spring.

* * * * *